United States Patent
Chen et al.

(10) Patent No.: US 7,194,466 B2
(45) Date of Patent: Mar. 20, 2007

(54) OBJECT CLUSTERING USING INTER-LAYER LINKS

(75) Inventors: Zheng Chen, Beijing (CN); Ji-Dong Wang, Beijing (CN); Hua-Jun Zeng, Beijing (CN); Xiaoming Sun, Beijing (CN); Li Tao, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 420 days.

(21) Appl. No.: 10/427,548

(22) Filed: May 1, 2003

(65) Prior Publication Data
US 2004/0220963 A1 Nov. 4, 2004

(51) Int. Cl.
*G06F 17/30* (2006.01)

(52) U.S. Cl. .............. 707/6; 707/7; 707/102; 707/104.1

(58) Field of Classification Search ........... 707/103 R, 707/6, 7, 102, 104.1
See application file for complete search history.

(56) References Cited

U.S. PATENT DOCUMENTS

| | | | | |
|---|---|---|---|---|
| 5,297,042 A | * | 3/1994 | Morita | 707/5 |
| 5,812,134 A | * | 9/1998 | Pooser et al. | 715/848 |
| 6,112,202 A | * | 8/2000 | Kleinberg | 707/5 |
| 6,169,986 B1 | | 1/2001 | Bowman et al. | |
| 6,560,600 B1 | * | 5/2003 | Broder | 707/7 |
| 6,742,003 B2 | * | 5/2004 | Heckerman et al. | 707/104.1 |
| 2003/0065632 A1 | * | 4/2003 | Hubey | 706/15 |
| 2003/0110181 A1 | * | 6/2003 | Schuetze et al. | 707/103 R |
| 2003/0208482 A1 | | 11/2003 | Kim et al. | |
| 2003/0226100 A1 | * | 12/2003 | Farahat et al. | 715/500 |
| 2003/0233370 A1 | * | 12/2003 | Barabas et al. | 707/103 R |

FOREIGN PATENT DOCUMENTS

| | | |
|---|---|---|
| DE | 10029644 | 1/2002 |
| EP | 0809197 | 11/1997 |
| EP | 1320042 | 6/2003 |
| WO | WO9749048 | 12/1997 |
| WO | WO9948028 | 9/1999 |

OTHER PUBLICATIONS

"Open Directory Project" http://dmoz.org/ Netscape 1998-2004 1 page.
Attardi, G. et al.: "Automatic web Page Categorization by Link and context Analysis" Proceedings of THIA, European Symposium on Intelligence, 1999. *the whole document*.
Brin S et al: "The anatomy of a large-scale hypertextual web search engine" Computer Networks and ISDN Systems, North Holland Publishing. Amsterdam, NL, vol. 30, No. 1-7, Apr. 1998, pp. 107-117.

(Continued)

*Primary Examiner*—John Cottingham
*Assistant Examiner*—Robert M. Timblin
(74) *Attorney, Agent, or Firm*—Lee & Hayes, PLLC

(57) ABSTRACT

One aspect relates to clustering a group of objects of a first object type based on a relative importance using links extending between objects of the first object type and certain objects of the second object type. In one embodiment, the first object type is a Web page object type and the second type is a user object type.

40 Claims, 8 Drawing Sheets

OTHER PUBLICATIONS

Harmandas, V. et al. "Image Retrieval by Hypertext Links" Association For Computing Machinery. Proceedings of the 20th Annual INternational ACM-SIFIR Conference on Research and Development in INformation Retrieval. Philadelphia, PA, Jul. 27-31, 1997, pp. 296-303.

Liu et al.; "Clustering Through Decision Tree Construction" 9th International Conference on Information and Knowledge Management 2000 10 pages.

Slattery, et al.; "Combining Statistical and Relational Methods for Learning in Hypertext Domains" Lecture Notes in Computer Science 1998 pp. 38-52.

Smith, J.R. et al.: "An Image and Video Search Engine for the World-Wide Web" Storage and retrieval for Image and video databases 5. San Jose, Feb. 13-14, 1997, Proceedings of SPIE, Bellingham, SpIE, US, vol. 3022, pp. 84-95.

Su et al; "Correlation-based Document Clustering using Web Logs" Proceedings of the 34th Hawaii International Conference on sytem Sciences 2001 7 pages.

Westerveld, T. et al: "Retriving Web Pages using Content, Links, URLs and Anchors" Test Retrieval Conference. Proceedings, XX, XX, 13, Nov. 2001,pp. 663-672.

"A Comparative Study on Feature Selection in Text Categorization" Proceedings of the Fourteenth International Conference on Machine Learning Morgan Kaufmann Publishers Inc. San Francisco CA USA 1997 pp. 412-420.

"CBC: Clustering Based Text Classification Requiring Minimal Labeled Data" Nov. 2003 Melbourne Florida. p. 443.

"Building a Web Thesaurus from Web Link Structure" SIGIR 2003 Toronto Canada; 8 pages.

"Survey of Clustering Data Mining Techniques" Accrue Software Inc.; 2002 pp. 1-56.

"A Unified Framework for Clustering Heterogeneous Web-Objects" Proceedings of the 3rd international Conference of Web Information System Engineering Singapore 2002 10 pages.

"Query Clustering Using User Logs" ACM Transactions on Information Systems vol. 20 No. 1; Jan. 2002 pp. 59-81.

"Clustering Methods for Collaborative Filtering" In Workshop on Recommendation System at the 15th National Conference on Artificial Intelligence 1998 16 pages.

"Probablistic Classification and Clustering in Relational Data" Proceedings of the 34th Hawaii International Conference on System Sciences 2001 7 pages.

"Correlation-based Document Clustering using Web Logs" Proceedings of the 34th Hawaii International Conference on sytem Sciences 2001 7 pages.

"A Comparison of Document Clustering Techniques" 6th ACM SIGKDD World Text Mining Conference Boston 2000 2 pages.

"Iterative Classification in Relational Data" Proceedings AAAI-2000 Workshop on Learning Statistical Models form Relational Data AAAI Press 2000 pp. 42-49.

"Inferring Web Communities from Link Topology" Proceedings of the 9th ACM Conference on Hypertext and Hypermedia 1998 17 pages.

"Identification of Web User Traffic Composisiton using Multi-Modal Clustering and Information Scent"1st SIAM ICDM Workshop on Web Mining Chicago 2001 13 pages.

"Authoritative Sources in a Hyperlinked Environment" Proceedings of the ACM-SIAM Symposium on Discrete Algorithms 1998 34 pages.

"Efficient Clustering of Very Large Document Collections" Data Mining for Scientific and Engineering Applications Chapter 1 Kluwer Academic Publishers 2001 pp. 1-25.

"The Missing Link—A Probabilistic Model of Document Content and Hypertext Connectivity" Proceedings of Neural Information Processing Systems 2001 7 pages.

"Data Mining for Hypertext: A tutorial survey" SIGKDD Explorations vol. 1 issue 2 Jan. 2000 11 pages.

Kim et al, "A Comparison of Collocation-Based Similarity Measures in Query Expansion", Information Processing & Management, Elsevier Science Ltd, vol. 35, No. 1, Jan. 1999 pp. 19-30.

Raghavan et al, "On the Reuse of Past Optimal Queries", SIGIR '95 Proceedings of the 18th Annual International ACM SIGIR Conference on Research and Development in Information Retrieval, Jul. 9, 1995, pp. 344-350.

Beeferman D. & Berger A. "Agglomerative clustering of a search engine query log" Proceedings of the ACM SIGKDD, International cnference on Knowledge Discovery and Data Mining, ACM, US, 2000, pp. 407-416, XP002339640.

Srivastava et al. "Discovery and Applications of Usage Patterns from Web Data" Sigkdd Explorations, Jan. 2000 (2000-20001), pp. 12-23, XPoo2241892 *the whole document*.

Kim et al, "A Comparison of Collocation-Based Similarity Measures in Query Expansion", Information Processing & Management, Elsevier Science Ltd, vol. 35, No. 1, Jan. 1999 pp. 19-30.

Qiu et al, "Concept Based Query Expansion", SIGIR Forum, Association for Computing Machinery, New York, Jun. 27, 1993, pp. 160-169.

Raghavan et al, "On the Reuse of Past Optimal Queries", SIGIR '95, Proceedings of the 18th Annual International ACM SIGIR Conference on Research and Development in Information Retrieval, Jul. 9, 1995, pp. 344-350.

Beeferman D. & Berger A. "Agglomerative clustering of a search engine query log" Proceedings of the ACM SIGKDD. International cnference on Knowledge Discovery and Data Mining, ACM, US, 2000, pp. 407-416, XP002339640.

Srivastava et al. "Web Usage Mining: Discovery and Applications of Usage Patterns from Web Data" Sigkdd Explorations, Jan. 2000 (2000-20001), pp. 12-23, XPoo2241892 *the whole document*.

Boyan et al., "A Machine Learning Architecture for Optimizing Web Search Engines", AAAI Workshop on Internet-Based Information Systems, 1996, pp. 1-8, Retrieved from the Internet http://www.cs.cornell.edu/People/tj/publications/boyan_etal_96a.pdf.

Frei et al., "The Use of Semantic Links in Hypertext Information Retrieval" Information Processing & Management, Elsevier, Barking, GB, vol. 31, No. 1, Jan. 2, 1995, pp. 1-13.

Li, "Toward a Qualitive Search Engine" Internet Computing, IEEE, vol. 2, No. 4, Jul. 1998, pp. 24-29, Retrieved from the Internet at http://ieeexplore.ieee.org/xpl/abs_free.jsp?arNumber=707687.

Marchioro, Massimo, "The Quest for Correct Information on the Web: Hyper Search Engines" Computer Networks and ISDN Systems, North Holland Publishing, Amsterdam, NL, vol. 29, No. 8-13, Sep. 1997, pp. 1225-1235.

* cited by examiner

OBJECT CLUSTERING USING INTER-LAYER LINKS

TECHNICAL FIELD SECTION

This disclosure relates to clustering, and more particularly to clustering heterogeneous objects (certain embodiments are also referred to herein as clustering of multiple types of inter-related objects).

BACKGROUND

Clustering involves grouping of multiple objects, and is used in such applications as search engines and information mining. Clustering algorithms group objects based on the similarities of the objects. For instance, Web page objects are clustered based on their content, link structure, or their user access logs. The clustering of users is based on the items they have selected. User objects are clustered based on their access history. Clustering of items associated with the users is traditionally based on the users who selected those items. A variety of clustering algorithms are known. Prior-art clustering algorithms include partitioning-based clustering, hierarchical clustering, and density-based clustering.

The content of users' accessed Web pages or access patterns are often used to build user profiles to cluster Web users. Traditional clustering techniques are then employed. In collaborative filtering, clustering is also used to group users or items for better recommendation/prediction.

Use of these prior clustering algorithms, in general, has certain limitations. Traditional clustering techniques can face the problem of data sparseness in which the number of objects, or the number of links between heterogeneous objects, are too sparse to achieve effective clustering of objects. With homogenous clustering, the data set being analyzed contains the same type of objects. For example, if the homogenous clustering is based on a Web page and a user, then the Web page objects and the user objects will each be clustered separately. If the homogenous clustering is based on an item and a user, then the item objects and the user objects will each be clustered separately. In such homogenous clustering embodiments, those objects of the same type are clustered together without consideration of other types of objects.

Prior-art heterogeneous object clustering cluster the object sets separately. The heterogeneous object clustering uses the links only as flat features representing each object node. In prior art heterogeneous clustering, the overall link structure inside and between the layers is not considered, or alternatively simply treated as separated features.

SUMMARY

This disclosure relates generally to clustering. One aspect of the disclosure relates to clustering a group of objects using links extending between certain objects of the first object type and certain objects of the second object type. In one embodiment, the first object type is a Web page object type and the second object type is a user object type.

BRIEF DESCRIPTION OF THE DRAWINGS

Throughout the drawings, the same numbers reference like features and components.

DETAILED DESCRIPTION

The use of computers and networked environments, such as the Internet, continues to expand rapidly. One important tool that allows larger networks, such as the Internet, to be effectively used, is search tools. Clustering of objects stores and retrieves those objects that are of similar types. Clustering is used in many aspects of search tools to permit a user to retrieve applicable data from such memory locations as a database without also retrieving a lot of marginally significant data. Certain aspects of this disclosure make clustering more applicable to retrieving and storing large sets of data objects.

One embodiment of the present disclosure provides for clustering of heterogeneous objects. Clustering of heterogeneous objects is also considered clustering of multiple types of inter-related objects.

Figure 1:
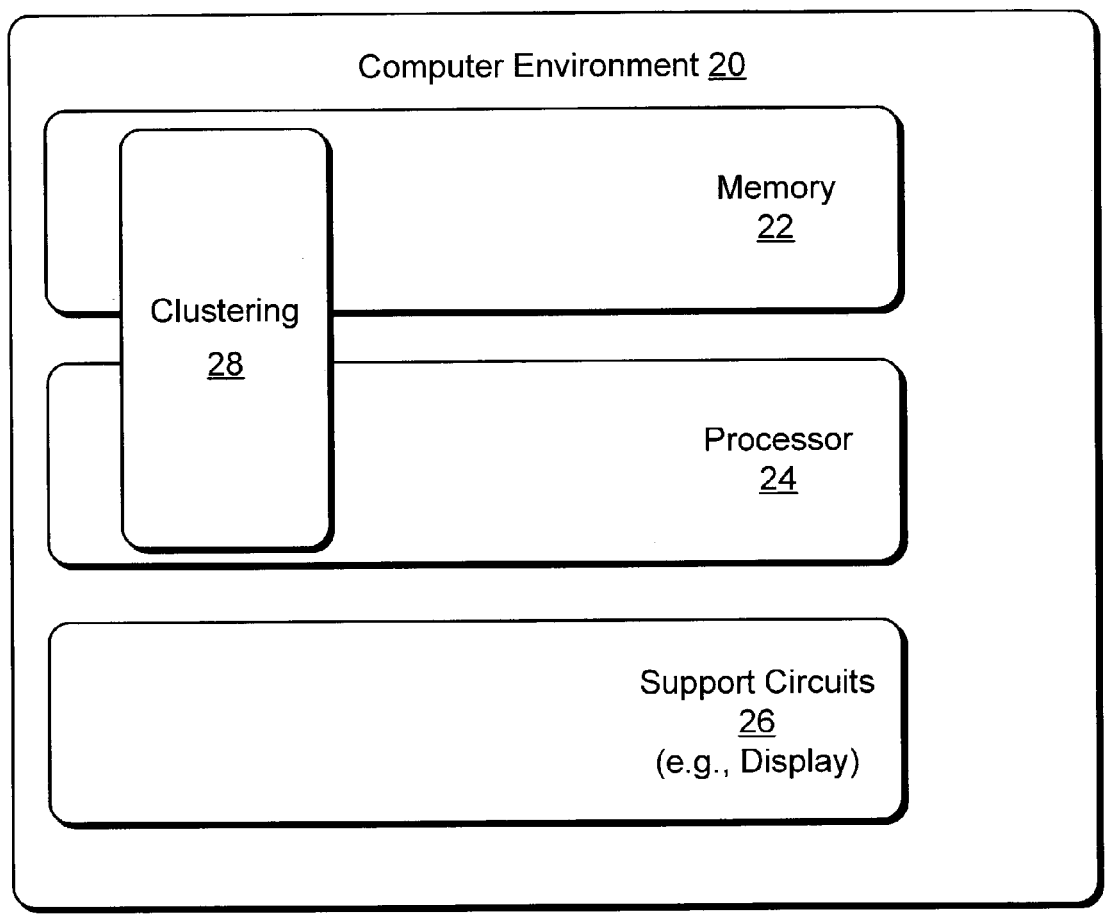
FIG. 1 is a block diagram of one embodiment of computer environment that can be used for clustering.

One embodiment of computer environment 20 (that is a general purpose computer) that can benefit by the use of clustering is shown in FIG. 1. The computer environment 20 includes a memory 22, a processor 24, a clustering portion 28, and support circuits 26. The support circuits include such devices as a display and an input/output circuit portion that allow the distinct components of the computer environment 20 to transfer information (i.e., data objects).

Clustering is performed within the clustering portion 28. The clustering portion 28 can be integrated within the memory 22 and the processor 24 portions of the computer environment. For example, the processor 24 processes the clustering algorithm (which is retrieved from memory) that clusters the different objects. The memory 22 (such as databases) is responsible for storing the clustered objects and the associated programs and clustering algorithms so that the clustered objects can be retrieved (and stored) as necessary. The computer environment 20 may be configured as a stand-alone computer, a networked computer system, a mainframe, or any of the variety of computer systems that are known. Certain embodiments disclosed herein describe a computer environment application (a computer downloading Web pages from the Internet). It is envisioned that the concepts described herein are applicable to any known type of computer environment 20.

This disclosure provides a clustering mechanism by which the percentage of the returned results that are considered reliable (i.e., are applicable to the user's query) is increased. Clustering can be applied to such technical areas as search tools, information mining, data mining, collaborative filtering, etc. Search tools have received attention because of their capabilities to serve different information needs and achieve improved retrieval performance. Search tools are associated with such computer aspects as Web pages, users, queries, etc.

The present disclosure describes a variety of clustering algorithm embodiments for clustering data objects. Clustering of data objects is a technique by which large sets of data objects are grouped into a larger number of sets or clusters of data objects (with each of the larger number of clusters of data objects having fewer data objects). Each data object contained within a clustered group of data objects has some similarity. One aspect of clustering therefore can be considered as grouping of multiple data objects.

Figure 2:
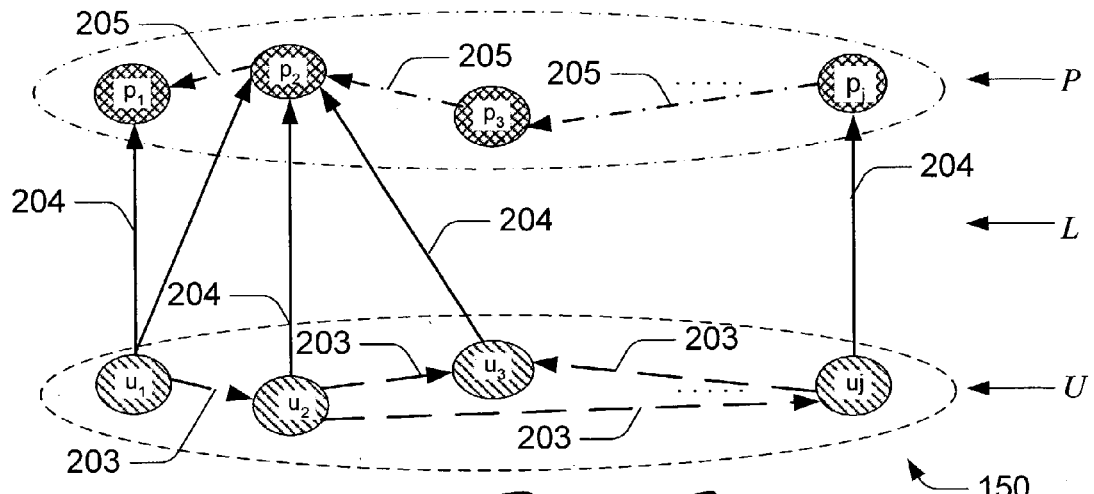
FIG. 2 is a block diagram of one embodiment of a framework for clustering heterogeneous objects.

One clustering mechanism described in this disclosure relates to a framework graph 150, one embodiment of the framework graph is illustrated in FIG. 2. Certain embodiments of a unified clustering mechanism are provided in which different types of objects are clustered between different levels or node sets P and U as shown in the framework graph 150 of FIG. 2. It is also envisioned that the concepts described in this disclosure can be applied to three or more layers, instead of the two layers as described in the disclosure. Each node set P and U may also be considered a layer. In this disclosure, the term "unified" clustering applies to a technique for clustering heterogeneous data. The node set P includes a plurality of data objects $p_1, p_2, p_3, \ldots, p_I$ that are each of a similar data type. The node set U includes a plurality of data objects $u_1, u_2, u_3, \ldots, u_J$ that are each of a similar data type. The data type of the objects clustered on each node set (P or U) is identical, and therefore the data objects in each node set (P or U) are homogenous. The type of the data objects $p_1, p_2, p_3, \ldots, p_I$ that are in the node set P are different from the types of the data objects $u_1, u_2, u_3, \ldots, u_J$ that are in the node set U. As such, the types of data objects that are in different ones of the node sets P and U are different, or heterogeneous. Certain aspects of this disclosure provide for clustering using inputs (based on links) from homogenous and heterogeneous data types of objects.

Links are illustrated in this disclosure by lines extending between a pair of data objects. Links represent the relationships between pairs of data objects in clustering. In one instance, a link may extend from a Web page object to a user object, and represent the user selecting certain Web pages. In another instance, a link may extend from a Web page object to another Web page object, and represent relations between different Web pages. In certain embodiments of clustering, the "links" are referred to as "edges". The generalized term "link" is used in this disclosure to describe links, edges, or any connector of one object to another object that describes a relationship between the objects.

There are a variety of different types of links (as described in this disclosure) that relate to clustering different types of objects that associate different ones of the objects as set forth in the framework graph 150. The links can be classified as either inter-layer link or intra-layer link. An intra-layer link 203 or 205 is one embodiment of link within the framework graph 150 that describes relationships between different objects of the same type. An inter-layer link 204 is one embodiment of link within the framework graph 150 that describes relationships between objects of different types. As shown in FIG. 2, there are a plurality of intra-layer links 203 extending between certain one of the data objects $u_1, u_2, u_3, \ldots, u_J$. In the embodiment shown in FIG. 2, there are also a plurality of intra-layer links 205 extending between certain ones of the data objects $p_1, p_2, p_3, \ldots, p_I$. In the embodiment shown in FIG. 2, there are also a plurality of inter-layer links 204 extending between certain ones of the data objects $u_1$, $u_2, u_3, \ldots, u_J$ in the node set P and certain ones of the data objects $p_1, p_2, p_3, \ldots, p_I$ in the node set U. Using inter-layer links recognizes that clustering of one type of object may be affected by another type of object. For instance, clustering of web page objects may be affected by user object configurations, state, and characteristics.

Figure 3:
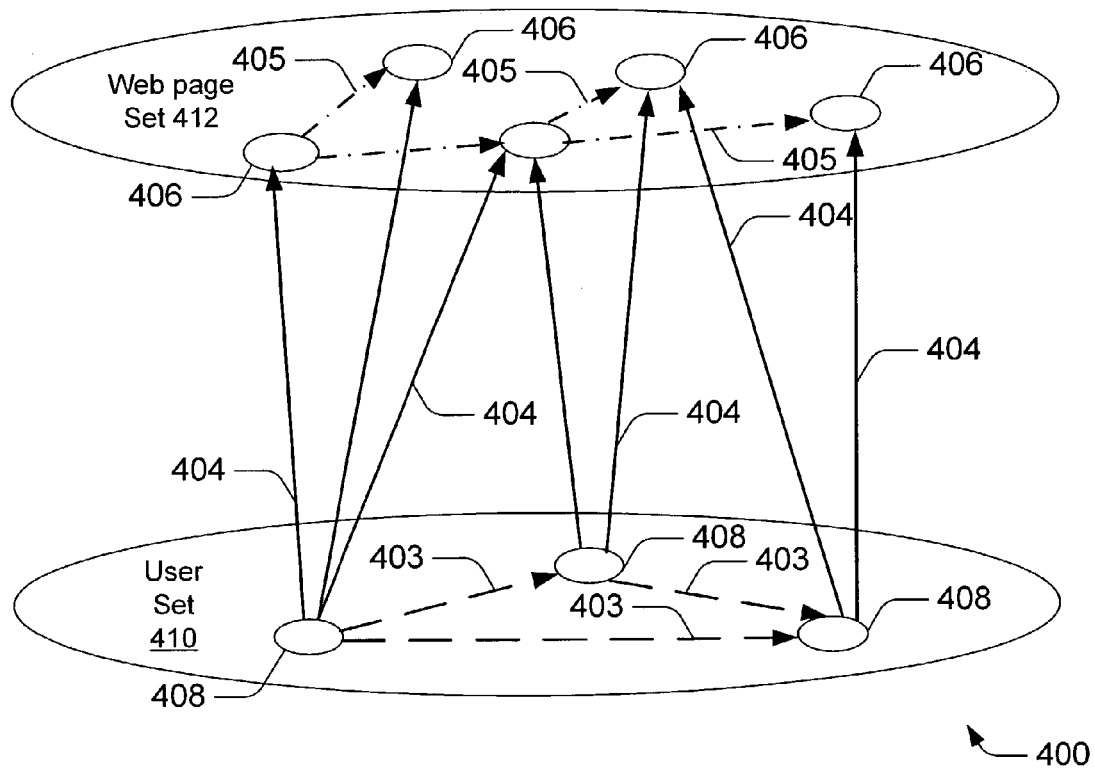
FIG. 3 is a block diagram of one embodiment of hybrid net model.

The link direction (as provided by the arrowheads for the links 203, 204, or 205 in FIG. 2, and also in FIG. 3) are illustrated as bi-directional since the relationships between the data objects may be directed in either direction. The links are considered illustrative and not limiting in scope. Certain links in the graph in the framework graph 150 may be more appropriately directed in one direction, the direction of the arrowhead typically does not affect the framework's operation. The framework graph 150 is composed of node set P, node set U, and link set L. With the framework graph, 150, $p_i$ and $u_j$ represent two types of data objects, in which $p_i \in P$ (i=1, \ldots, I) and $u_j \in U$ (j=1, \ldots, J). I and J are cardinalities of the node sets P and U, respectively.

Links $(p_i, u_j) \in L$ are inter-layer links (which are configured as 2-tuples) that are illustrated by reference character 204 between different types of objects. Links $(p_i, p_j) \in L$ and $(u_i, u_j) \in L$, that are referenced by 205 and 203, respectively, are intra-layer links that extend between the same type of object. For simplicity, different reference characters are applied for inter-layer link sets (204) and intra-layer link sets (203, 205).

Using unified clustering, links are more fully utilized among objects to improve clustering. The clustering of the different types of objects in the different layers is reinforced by effective clustering. If objects are clustered correctly then clustering results should be more reasonable. Clustering can provide structuralized information that is useful in analyzing data.

The framework graph 150 illustrates clustering of multiple types of objects in which each type of objects is substantially identical (e.g., one type pertains to a group of web pages, a group of users, or a group of documents, etc.). The type of each group of objects generally differs from the type of other groups of the objects within the framework graph 150.

The disclosed clustering technique considers and receives input from different (heterogeneous) object types when clustering. One aspect of this disclosure is based on an intrinsic mutual relation in which the objects being clustered is provided with links to other objects. Certain ones of the links (and the objects to which those links connect) that connect to each object can be weighted with different importance to reflect their relevance to that object. For example, objects of the same types as those being clustered can be provided with greater importance than objects of a different type. This disclosure provides a mechanism by which varying levels of importance can be assigned to different objects or different types of objects. This assigning of different levels of importance to different objects (or different types of objects) is referred to herein as clustering with importance. The varying levels of importance of the different objects often results in improved clustering results and effectiveness.

In the embodiment of the framework graph 150 for clustering heterogeneous objects as shown in FIG. 2, the different node sets P or U represent different layers each containing different object types. The multiple node sets (P and U are illustrated) of the framework graph 150 provide a basis for clustering. The two-layered directed graph 150 contains a set of data objects to be clustered. Objects of each type of object types (that are to be clustered according to the clustering algorithm) can be considered as the instance of a "latent" class. The links 203, 204, or 205 that extend between certain ones of the object nodes reflect inherent relations among the object nodes that are provided by the clustering. An iterative projecting technique for clustering, several embodiments of which are described in this disclosure, enables separate clustering of objects that have separate data types to contribute to the clustering process.

The heterogeneous types of objects (and their associated links) are reinforced by using the iterative clustering techniques as described herein. The iterative clustering projection technique relies on obtaining clustering information from separate types of objects that are arranged in separate layers, with each layer containing a homogenous type of object. The node information in combination with the link information is used to iteratively project and propagate the clustered results (the clustering algorithm is provided between layers) until the clustering converges. Iteratively clustering results of one type of object into the clustering results of another type of object can reduce clustering challenges associated with data sparseness. With this iterative projecting, the similarity measure in one layer clustering is calculated on clusters instead of individual groups of clusters of another type.

Each type of the different kinds of nodes and links are examined to obtain structural information that can be used for clustering. Structural information, for example, can be obtained considering the type of links connecting different data objects (e.g., whether a link is an inter-layer link or an intra-layer link). The type of each object is indicated by its node set P or U, as indicated in FIG. 2.

The generalized framework graph 150 of FIG. 2 can be applied to a particular clustering application. Namely, the framework graph 150 can illustrate a group of Web pages on the Internet relative to a group of users. The Web page layer is grouped as the node set P. The user layer of objects is grouped as the node set U. The framework graph 150 integrates the plurality of Web page objects and the plurality of user objects in the representation of the two-layer framework graph 150. The framework graph 150 uses link (e.g., edge) relations 203, 204, 205 to facilitate the clustering of the different type of objects (as outlined by the generalized FIG. 2 framework graph). The link structure of the whole data set is examined during the clustering procedure to learn the different importance level of nodes. The nodes are weighted based on their importance in the clustering procedure to ensure that important nodes are clustered more reasonably.

In certain embodiments of the present disclosure, the links 203, 204, and 205 among clusters in the links are reserved. Reserved links are those links that extend between clusters of objects instead of the objects themselves. For example, one reserved link extends between a web-page cluster and a user cluster (instead of between a web page object and a user object as with the original links). In certain embodiments, the reserved links are maintained for a variety of future applications, such as a recommendation in the framework graph 150. E.g., the clustering result of Web page/user clustering with reserved links could be shown as a summary graph of user hits behaviors, which provides the prediction of user's hits.

The content of the respective nodes $p_i$ and $u_j$ are denoted by the respective vectors $f_i$ and $g_j$ (not shown in FIG. 2). Depending on the application, each individual node $p_i$ and $u_j$ may have (or may not have any) content features. Prior-art clustering techniques cluster the nodes $p_i$ independently from the nodes $u_j$. In contrast, in the clustering framework 150 described in this disclosure the nodes $p_i$ and the nodes $u_j$ are clustered dependently based on their relative importance. The clustering algorithm described herein uses a similarity function to measure distance between objects for each cluster type to produce the clustering. The cosine-similarity function as set forth in (1) can be used for clustering:

$$s_c(x, y) = \cos(f_x, f_y) = \frac{\sum_{i=1}^{kx} f_x(i) \cdot \sum_{j=1}^{ky} f_y(j)}{\sqrt{\sum_{i=1}^{kx} f_x^2(i)} \cdot \sqrt{\sum_{j=1}^{ky} f_y^2(j)}} \quad (1)$$

$$s_c(x, y) = \cos(f_x, f_y) = \frac{f_x \cdot f_y}{\|f_x\|\|f_y\|} = \frac{\sum_{k, f_x(k) = f_y(k)} f_x(k) f_y(k)}{\sqrt{\sum_{i=1}^{kx} f_x^2(i)} \cdot \sqrt{\sum_{j=1}^{ky} f_y^2(j)}} \quad (2)$$

$f_x \cdot f_y$ is the dot product of two feature vector. It equals to the sum of weight product of the same component in fx and fy. $s_c$ denotes that the similarity is based on content feature; $f_x(i)$ and $f_y(j)$ are ith and jth components of the feature vector $f_x$ and $f_y$. kx is the number of items in the respective feature $f_x$; and ky is the number of items in the feature $f_y$.

In this disclosure, the node set P is used as an example to illustrate the inter-layer link 204 and the intra-layer links 203 and 205 of the nodes. All data is assumed to comprise a sequence of node pairs, for intra-layer node pairs $(p^{(1)}, p^{(1)})$, $(p^{(2)}, p^{(2)})$, . . . [where $p^{(1)}$ and $p^{(2)}$ are the same as $p_i$, and the pairs $(p^{(1)}, p^{(1)})$, $(p^{(2)}, p^{(2)})$, both stands for a node in the homogeneous layer] such as connected by links 203 or 205; and for inter-layer pairs $(p^{(1)}, u^{(1)})$, $(p^{(2)}, u^{(2)})$, . . . , such as connected by links 204. Thus a link between a pair of nodes $(p_i, p_k)$ or $(p_i, u_j)$ represents one or more occurrence of identical pairs in the data series. The weight of the link relates to its occurrence frequency.

In this disclosure, two separate vectors represent features of the inter-layer links 204 and the intra-layer links 203, 205 for each particular node. For example, the intra-layer link 203, 205 features are represented using a vector whose components correspond to other nodes in the same layer. By comparison the inter-layer link 204 feature is represented using a vector whose components correspond to nodes in another layer. Each component could be a numeric value representing the weight of link from (or to) the corresponding node. For example, the inter-layer link 204 feature of nodes $p_1$ and $p_2$ (as shown in FIG. 2) can be represented as $[1, 0, 0, \ldots, 0]^T$ and $[1, 1, 1, \ldots, 0]^T$, respectively.

Thus, the corresponding similarity function could be defined as cosine-similarity as above. The similarity function $s_{lx}(x,y)$ for intra-layer link 203, 205 features determines the similarity between nodes $p_1$ and $p_2$ is applied is described in (3) as follows:

$$s_{l1}(x, y) = \cos(l_x, l_y) = \frac{l_x \cdot l_y}{\|l_x\|\|l_y\|} \quad (3)$$

By comparison, the similarity function $s_{lx}(x,y)$ for inter-layer link 204 features determines the similarity between nodes $p_1$ and $u_2$ in (4) as follows:

$$s_{l2}(x, y) = \cos(h_x, h_y) \quad (4)$$

where $s_{l1}$ and $s_{l2}$ respectively denote that the similarities are based on respective intra-layer and inter-layer link features; $l_x$ and $l_y$ are intra-layer link feature vectors of node x and node y; while $h_x$ and $h_y$ are inter-layer link feature vectors of node x and node y.

Other representations of link features and other similarity measures could be used, such as representing links of each node as a set and applying a Jaccard coefficient. There are multiple advantages of the embodiments described herein. One advantage is that certain ones of the embodiments of clustering algorithms accommodate weighted links. Moreover, such clustering algorithms, as the k-means clustering algorithm, facilitate the calculation of the centroid of the clustering. The centroid is useful in further calculations to indicate a generalized value or characteristic of the clustered object.

The overall similarity function of node x and node y can be defined as the weighted sum of the three similarities including the three weighted values α, β, and γ as set forth in (5). There are two disclosed techniques to assign the three weighted values: heuristically and by training. If, for example, there is no tuning data, the weights are assigned manually to some desired value (e.g. alpha=0.5, beta=0.25, and gamma=0.25). If there is some extra tuning data, by comparison, then the weights can be calculated using a greedy algorithm, a hill-climbing algorithm, or some other type of either local or global improvement or optimizing program. A greedy algorithm refers to a type of optimization algorithm that seeks to improve each factor in each step, so that eventually an improved (and optimized in certain embodiments) solution can be reached.

$$s(x, y) = \alpha s_c(x, y) + \beta s_{l1}(x, y) + \gamma s_{l2}(x, y) \quad (5)$$

where $\alpha + \beta + \gamma = 1$.

Using these calculations, the content of the nodes, and the similarity of the nodes, are determined. Depending on the application, the three variables can be modified to provide different information values for the clustering algorithm. These contents and similarities of the nodes can thereupon be used as a basis for retrieval.

Many heterogeneous clustering problems often share the same property that the nodes are not equally important. Examples of heterogeneous clustering include Web page/user clustering, item/user clustering for collaborative filtering, etc. For these applications, important objects play an important role in getting more reasonable clustering results. In this disclosure, the link structure of the whole dataset is used to learn the importance of nodes. For each node in the node set P and U, for example $p_i$ and $u_j$, importance weights $ip_i$, and $iu_j$ are calculated by the link structure and are used in clustering procedure.

One clustering aspect relates a link analysis algorithm, multiple embodiments of which are provided in this disclosure. In one embodiment of the link analysis algorithm, a hybrid net model 400 as shown in FIG. 3 is constructed. Using the hybrid net model 400, the users and the Web pages are used as two illustrative types of nodes. The FIG. 3 embodiment of hybrid net model involving Web page and user types of objects is particularly directed to types of clustering involving the Internet, intranets, or other networks. The links include Web page hyperlinks/interactions as shown by link 405, user-to-Web page hyperlinks/interactions as shown by link 404, and user-to-user hyperlinks/interactions as shown by link 403. The hybrid net model 400 of FIG. 3 explicates these hyperlinks/relations by indicating the relations in and between users and Web pages that are illustrated by links 403, 404, and 405.

Given a certain group of users 408 that are contained within a user set 410, all Web pages that any of the nodes from the user set 410 have visited form the Web page set 412. The Web page set 412 is determined by sending the root Web page set to search engines and obtain a base Web page set. Three kinds of links represented by the arrows in FIG. 3 have different meanings. Those links represented by the arrows 405 that are contained within the Web page set 412 indicate hyperlinks between Web pages. Those links represented by arrows 403 that are contained within the user set 410 indicate social relations among users. Those links represented by arrows 404 that extend between the users set 410 and the Web page set 412 indicate the user's visiting actions toward Web pages. The links represented by arrows 404 indicate the user's evaluation of each particular Web page, so the authority/hub score of a Web page will be more credible. Since the different types of links 403, 404, and 405 represent different relations. Each link can be weighted with a different importance depending, for example, on how often the link is accessed or how each pair of nodes that are connected by the link are associated.

Figure 4:
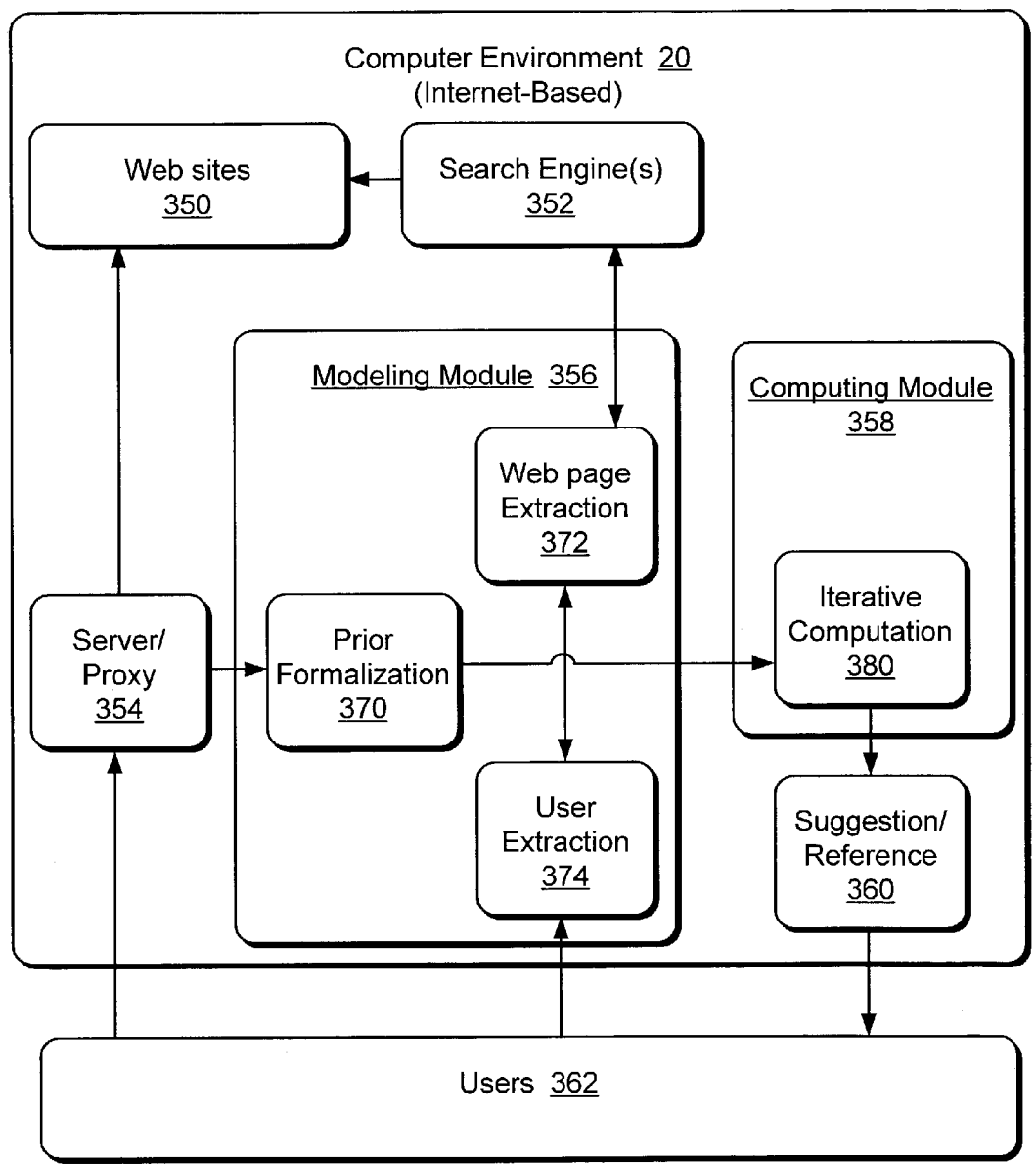
FIG. 4 is a block diagram of another embodiment of computer environment that is directed to the Internet.

FIG. 4 illustrates one embodiment of the computer environment 20 that is configured to perform clustering using the Internet. One aspect of such clustering may involve clustering the Web pages based on users (including the associated inter-layer links and the intra-layer links). The computer environment includes a plurality of Web sites 350, a search engine 352, a server/proxy portion 354, a modeling module 356, a computing module 358, and a suggestion/reference portion 360. The computer environment 20 interfaces with the users 362 such as with a graphical user interface (GUI). The computing module 358 includes an iterative computation portion 380 that performs the clustering algorithm (certain embodiments of which rely on iterative computation). The modeling module 356 acts to collect data and track data (e.g., associated with the objects). The search engines return search results based on the user's query. The Web sites 350 represent the data as it is presented to the user. The server/proxy communicates the queries and the like to a server that performs much of the clustering. The suggestion/reference portion 360 allows the user to modify or select the clustering algorithm.

The modeling module 356 includes a prior formalization portion 370, a webpage extraction portion 372, and a user extraction portion 374. Portions 370, 372, and 374 are configured to provide and/or track data that has been previously formalized 370, is extracted from a Web page, or is extracted from the user 362. The embodiment of computer environment as illustrated in FIG. 4 is configured to provide a link analysis algorithm, one embodiment of which is described in this disclosure.

One embodiment of clustering algorithm can analyze a Web graph by looking for two types of pages: hubs, authorities, and users. Hubs are pages that link to a number of other pages that provide useful relevant information on a particular topic. Authority pages are considered as pages that are relevant to many hubs. Users access each one of authorities and hubs. Each pair of hubs, authorities, and users thereby exhibit a mutually reinforcing relationship. The clustering algorithm relies on three vectors that are used in certain embodiments of the present link analysis algorithm: the web page authority weight vector a, the hub weight vector h, and the user vector u. Certain aspects of these vectors are described in this disclosure.

Several of the following terms relating to the following weight calculations are not illustrated in the figures such as FIG. 3, and instead relate to the calculations. In one embodiment, for a given user i, the user weight $u_i$ denotes his/her knowledge level. For a Web page j, respective terms $a_j$ and $h_j$ indicate the authority weight and the hub weight. In one embodiment, each one of the three vectors (representing the user weight u, the web page authority weight a, and the hub weight h) are each respectively initialized at some value (such as 1). All three vectors h, a, and u are then iteratively updated based on the Internet usage considering the following calculations as set forth respectively in (6), (7), and (8):

$$\begin{cases} a(p) = \sum_{q \to p} h(q) + \sum_{r \to p} u(r) & (6) \\ h(p) = \sum_{p \to q} a(q) + \sum_{r \to p} u(r) & (7) \\ u(r) = \sum_{r \to p} a(p) + \sum_{r \to q} h(q) & (8) \end{cases}$$

where, p and q stand for specific web-pages, and r stands for a specific user. There are two kinds of links in certain embodiments of the disclosed network: the links between different pages (hyperlinks) and the links between users and pages (browsing patterns). Let $A=[a_{ij}]$ denote the adjacent matrix of the base set for all three vectors h, a, and u. Note that $a_{ij}=1$ if page i links to page j, or alternatively $a_{ij}=0$. $V=[v_{ij}]$ is the visit matrix of the user set to Web page set. Consider that $v_{ij}=1$ if user i visit page j, or alternatively $v_{ij}=0$. Also, as set forth in (8), (10), and (11):

$$\begin{cases} a = A^T h + V^T u & (9) \\ h = Aa + V^T u & (10) \\ u = V(a + h) & (11) \end{cases}$$

In a preferred embodiment, the calculation for vectors a, h, u as set forth in (9), (10), and (11) go through several iterations to provide meaningful results. Prior to the iterations in certain embodiments, a random value is assigned to each one of the vectors a, h, and u. Following each iteration, the values of a, h, u will be changed and normalized to provide a basis for the next iteration. Following each iteration, the iterative values of a, h, and u each tend to converge to a certain respective value. The users with high user weight $u_i$ and Web pages with high authority weight $a_j$ and/or hub weight $h_j$ can be reported. In a preferred embodiment, certain respective user or web-page objects can be assigned with higher values than other respective user or web-page objects. The higher the value is, the more importance is assigned to that object.

The embodiment of link analysis algorithm as described in this disclosure that can cluster thereby relies on iterative input from both Web pages and users. As such, weighted input from the user is applied to the clustering algorithm of the Web page. Using the weighted user input for the clustering improves the precision of the search results, and the speed at which the clustering algorithm can be performed.

While the link analysis algorithm described herein is applied to clustering algorithms for clustering Web pages based on users, it is envisioned that the link analysis algorithm can be applied to any heterogeneous clustering algorithm. This weighting partially provides for the clustering with importance as described herein.

A variety of embodiments of a clustering algorithm that can be used to cluster object types are described. Clustering algorithms attempt to find natural groups of data objects based on some similarity between the data objects to be clustered. As such, clustering algorithms perform a clustering action on the data objects. Certain embodiments of clustering algorithm also finds the centroid of a group of data sets, which represents a point whose parameter values are the mean of the parameter values of all the points in the clusters. To determine cluster membership, most clustering algorithms evaluate the distance between a point and the cluster centroid. The output from a clustering algorithm is basically a statistical description of the cluster centroids with the number of components in each cluster.

Multiple embodiments of cluster algorithms are described in this disclosure. The two-ways k-means cluster algorithm is based on the mutual reinforcement of clustering process. The two-ways k-means cluster algorithm is an iterative clustering algorithm. In the two-ways k-means cluster algorithm, the object importance is first calculated by (6)–(8) or (9)–(11), and the result is then applied in the followed iterative clustering procedure. The clustering algorithm clusters objects in each layer based on the defined similarity function. Although a great deal of clustering algorithms, such as k-means, k-medoids, and agglomerative hierarchical methods could be used, this disclosure describes the application of the k-means clustering algorithm.

There are several techniques to apply the calculated importance score of nodes. One technique involves modifying the basic k-means clustering algorithm to a 'weighted' k-means algorithm. In the modified k-means algorithm, the centroid of the given cluster is calculated using the weighted sum of the features with the weight setting determining the importance score. The nodes having a higher importance or weighting are thereby given more emphasis in forming the cluster centroid for both the content and the link features. Another embodiment involves modifying the nodes' link weight by their importance score, and then using the weighted link feature in the similarity function. In this way, the importance of the nodes is only reflected in the link feature in clustering process.

Figure 5A:
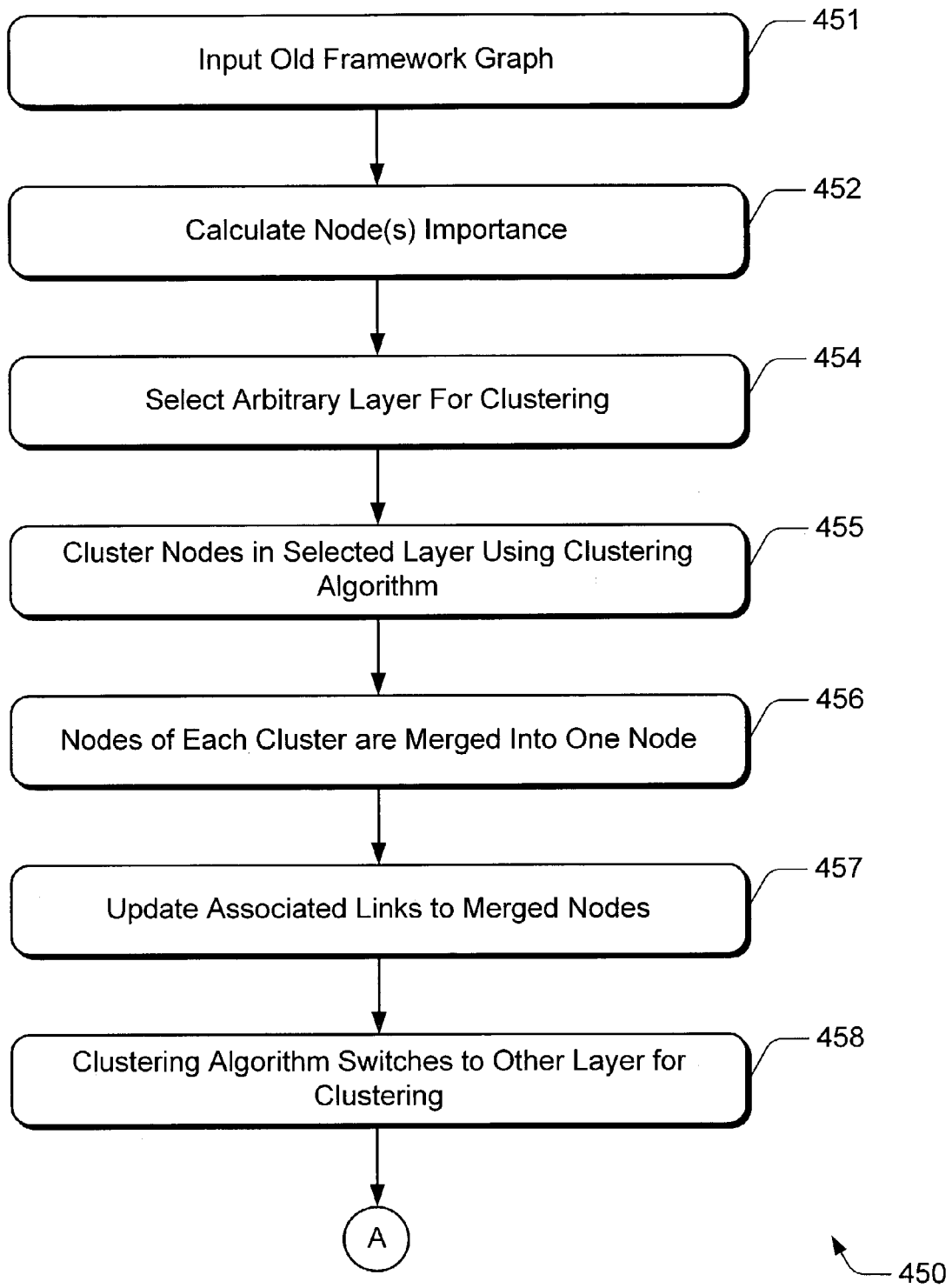
FIGS. 5*a* and 5*b* is a flow chart of one embodiment of clustering algorithm.
Figure 5B:
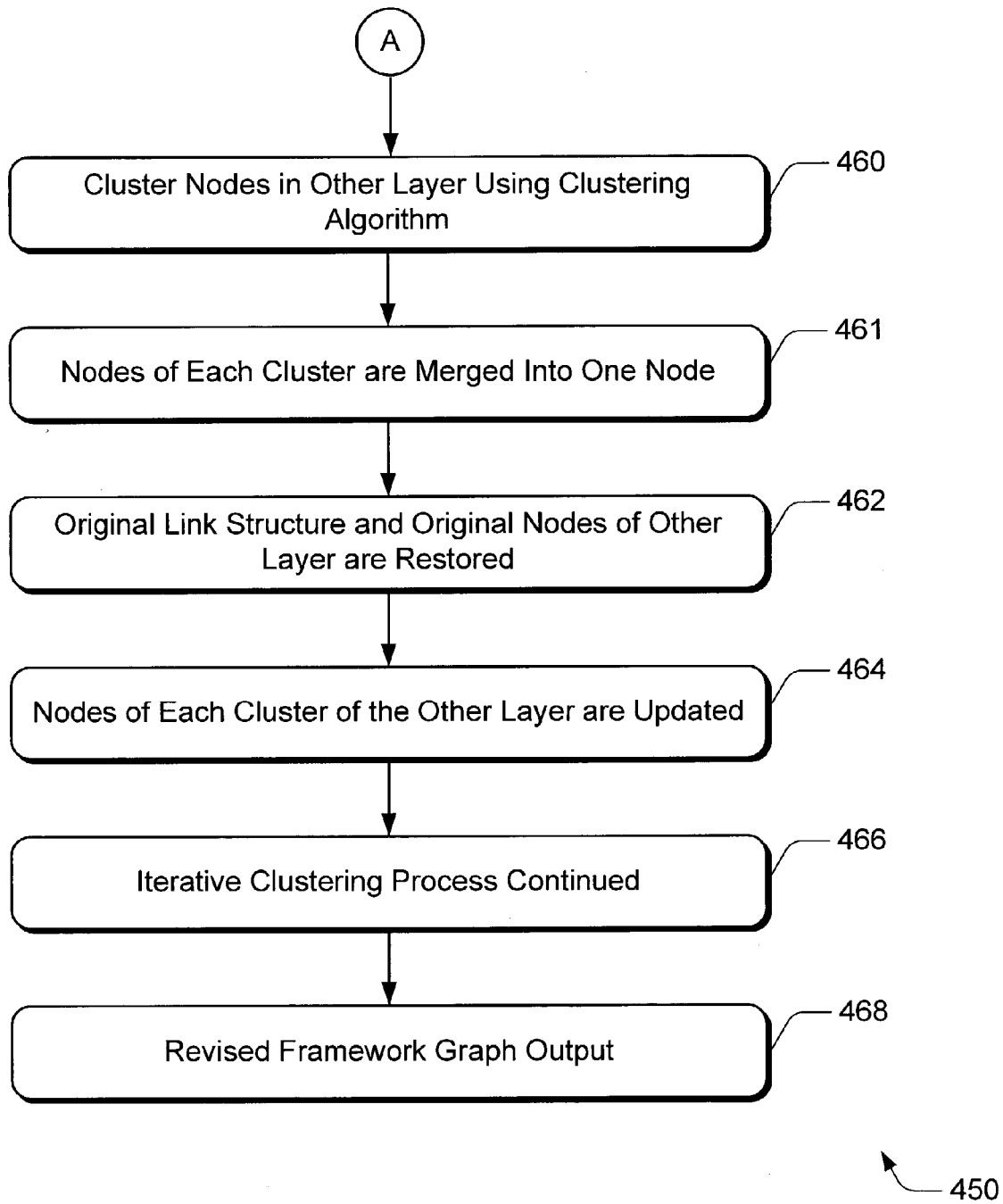

One embodiment of the input/output of the clustering algorithm is shown in FIGS. 5a and 5b. The input to the clustering algorithm includes a two-layered framework graph 150 (including the content features $f_i$ and $g_j$ of the nodes). The output to the clustering algorithm includes a new framework graph 150 that reflects the clustering. In certain embodiments of the new framework graph, the variations of each old node that has changed into its new node position can be illustrated.

One embodiment of a flow chart illustrating one embodiment of the clustering algorithm 450 is shown in FIGS. 5a and 5b. The clustering algorithm 450 includes 451 in which the original framework graph (prior to each clustering iteration) is input. In 452, the importance of each node being considered is determined or calculated using (6)–(8) or (9)–(11). In 454, an arbitrary layer is selected for clustering. Nodes in the selected layer are clustered in an appropriate fashion (e.g., according to content features) in 455. In certain embodiments, the nodes can be filtered using a desired filtering algorithm (not shown) to improve the clustering. In 456, the nodes of each cluster are merged into one node. For instance, if two candidate nodes exist following the filtering, the closest two candidate nodes can be merged by, e.g., averaging the vector values of the two candidate nodes. This merging allows individual nodes to be combined to reduce the number of nodes that have to be considered. As such, the merging operation can be used to reduce the occurrence of duplicates and near-duplicates.

The corresponding links are updated based on the merging in 457. In 458, the clustering algorithm switches to a second layer (from the arbitrarily selected layer) for clustering. In 460, the nodes of the second layer are clustered according to their content features and updated link features. In 461, the nodes of each cluster are merged into one node.

In 462, the original link structure and the original nodes of the other layer are restored. In 464, the nodes of each cluster of the second layer are merged, and the corresponding links are updated. In 466, this iterative clustering process is continued within the computer environment. In 468, a revised version of the framework graph 150 is output.

In the initial clustering pass, only the content features are utilized. Because in most cases the link feature are too sparse in the beginning to be useful for clustering. In subsequent clustering passes, content features and link features are combined to enhance the effectiveness of the clustering. By combining the content features and the link features, the weights are specified with different values and the results can be compared, and clustering having an improved accuracy can be provided.

The clustering algorithm as described relative to FIGS. 5a and 5b can be applied to many clustering embodiments. More particularly, one embodiment of clustering of Web pages based on how the Web pages are accessed by users is now described. In those types of link extends between a node of the user layer to a node of the Web page layer, a user $u_j$ has visited a Web page $p_i$ before if there is one link from $u_j$ to $p_i$. The weight of the link means the probability that the user $u_j$ will visit the page $p_i$ at a specific time, denoted as $Pr(p_i|u_j)$. It can be simply calculated by counting the numbers within the observed data, as shown in (12).

$$Pr(p_i | u_j) = \frac{C(p_i, u_j)}{\sum_{t \in P(u_j)} C(p_t, u_j)} \tag{12}$$

where, $P(u_j)$ is the set of pages that visited by the user $u_j$ before. $C(p_i, u_j)$ stands for the count that the user $u_j$ have visited page $p_i$ before.

Figure 6:
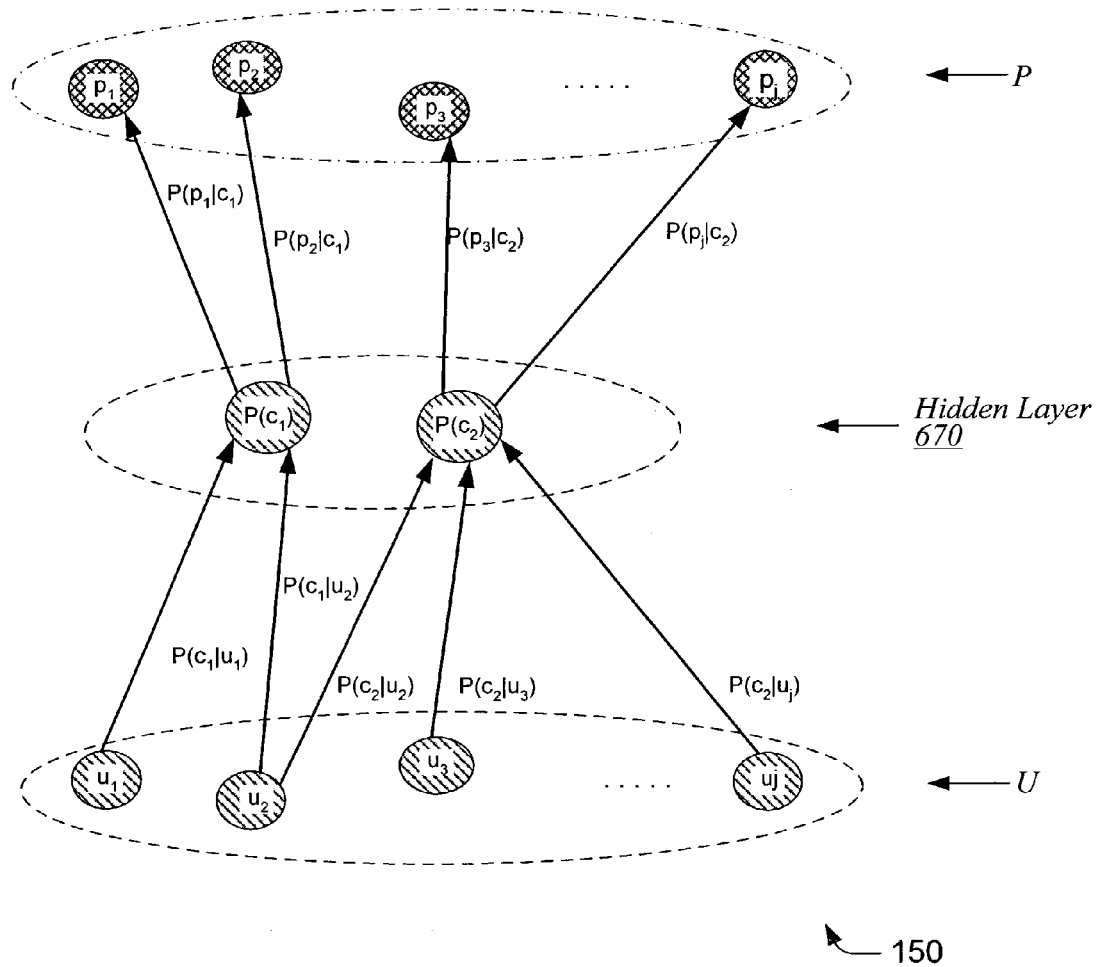
FIG. 6 is a block diagram of another embodiment of a framework for clustering heterogeneous objects that includes a hidden layer.

One embodiment of clustering algorithm, as shown in the embodiment of framework graph 150 of FIG. 6, involves a concept layer or hidden layer. In FIG. 6, for simplicity, the intra-layer link 203 and 205 that are shown in the framework graph of FIG. 2 are hidden. It is envisioned, however, that the embodiment of framework graph 150 as shown in FIG. 6 can rely on any combination of intra-layer links and inter-layer links and still remain within the concepts of the present disclosure.

The hidden layer 670 (in the embodiment of framework graph 150 as displayed in FIG. 6) lies between web-page layer and user layer. The hidden layer 150 provides an additional layer of abstraction (from which links extend to each of the node sets P and U) that permit modeling with improved realism compared to extending links between the original node sets P and U. One of the inter-layer links 204 of the embodiment of framework graph 150 such as shown in FIG. 2 (that does not have a hidden layer) may be modeled as a pair of hidden inter-layer links of the embodiment of framework graph 150 such as shown in FIG. 6. One of the hidden inter-layer links extends between the web-page layer containing the node set P and the hidden layer 670, and one of the hidden inter-layer links extends between the user layer and the hidden layer 670. The direction of the arrows on each hidden inter-layer link shown in FIG. 6 is arbitrary, as is the particular web pages and users in the respective node sets P and U that are connected by a hidden inter-layer link to a node in the hidden layer.

Links (i.e., hidden inter-layer links) that extend between the web-page layer containing the node set P and the hidden layer 670 indicate how likely a web-page $p_1$, $p_2$, etc. belongs to a particular concept node $P(c_1)$, $P(c_2)$, etc. in the hidden layer 670. Links (i.e., hidden inter-layer links) that extend between the user layer and the hidden layer 670 indicate how likely a user node $u_1$, $u_2$, etc. has interest in a particular concept node $P(c_1)$, $P(c_2)$, etc. within the hidden layer 670.

The links that extend between the web-page layer and the concept layer therefore each stand for the probability that a Web page $p_i$ is classified into a concept category $c_k$, denoted as $Pr(p_i|c_k)$. This model embodied by the framework graph shares the assumption used by Naïve Bayesian classification, in which different words are considered conditionally independent. So the concept $c_k$ can be represented as a normal distribution, i.e. a vector $\vec{\mu}_k$ for expectation and $\vec{\sigma}_k$ vector for covariance. The value $Pr(p_i|c_k)$ can be derived as per (13).

$$E(Pr(p_i | c_k)) = \frac{Pr(p_i | c_k)}{\sum_t Pr(p_i | c_k)} \tag{13}$$

$$= \frac{\prod_t Pr(w_{l,i} | c_k)}{\sum_t \prod_l Pr(w_{l,t} | c_k)}$$

$$= \frac{e^{-\sum_l \frac{1}{2\sigma_{l,k}}(w_{l,i} - \mu_{l,k})^2}}{\sum_t e^{-\sum_l \frac{1}{2\sigma_{l,k}}(w_{l,k} - \mu_{l,k})^2}}$$

where $w_{l,i}$ is the weight of web page $p_i$ on the lth word.

Those links (denoted as $Pr(c_k|u_j)$) that extend between a node in the user layer and a node in the hidden layer reflect the interest of the user in the category reflected by the concept. Thus, one vector $(I_{j1}, I_{j2}, \ldots, I_{jn})$, $I_{jk} = Pr(c_k|u_j)$ corresponds to each user, in which n is the number of the hidden concept. The links shown in FIG. 6 can be considered as the vector models of the user. The vector is constrained by the user's usage data as set forth in (14).

$$Pr(p_i \mid u_j) = \sum_l Pr(p_i \mid c_l, u_j) Pr(c_l \mid u_j) \quad (14)$$

$$\approx \sum_l Pr(p_i \mid c_l) Pr(c_l \mid u_j)$$

Thus, the value $Pr(c_k \mid u_j)$ can be obtained by finding the solution from (13).

To simplify, $Pr(p_i \mid u_j) = R_{i,j}$, $Pr(p_i \mid c_k) = S_{i,k}$, and $Pr(c_k \mid u_j) = T_{k,j}$. The user j can be considered separately as set forth in (15).

$$\begin{bmatrix} R_{1,j} \\ R_{2,j} \\ \cdots \\ R_{|Page|,j} \end{bmatrix} = \begin{bmatrix} S_{1,1} & S_{1,2} & \cdots & S_{1,|Concept|} \\ S_{2,1} & S_{2,2} & & \\ & & \cdots & \\ S_{|Page|,1} & & \cdots & S_{|Page|,|Concept|} \end{bmatrix} \times \begin{bmatrix} T_{1,j} \\ T_{2,j} \\ \cdots \\ T_{|Concept|,j} \end{bmatrix} \quad (15)$$

where "|Page|" is the total number of the Web pages, and "|Concept|" is the total number of the hidden concept. Since |Page|>>|Concept|, a least square solution of $T_{k,j}$ can be solved using (15), or alternatively (16).

$$[R_{i,1} \; R_{i,2} \; \cdots \; R_{i,|User|}] = [S_{i,1} \; S_{i,2} \; \cdots \; S_{i,|Concept|}] \times \begin{bmatrix} T_{1,1} & T_{1,2} & \cdots & T_{1,|User|} \\ T_{2,1} & T_{2,2} & & \\ \cdots & & & \\ T_{|Concept|,1} & & & T_{|Concept|,|User|} \end{bmatrix} \quad (16)$$

where "|User|" is the total number of the users.

Since |User|>>|Concept|, we can also give a least square solution of $S_{i,k}$ as set forth in (17).

$$\vec{\mu}_j = \sum_t \vec{P}_t Pr(p_t \mid c_k) = \sum_k S_{t,k} \vec{P}_t \quad (17)$$

After the vector for expectation $\vec{\mu}_j$ is obtained, a new vector for covariance $\vec{\sigma}_j$ can be calculated. While the embodiment of framework graph 150 that is illustrated in FIG. 6 extends between the node set P and the node set U, it is envisioned that the particular contents of the node sets are illustrative in nature, and can be applied to any set of node sets.

Figure 7:
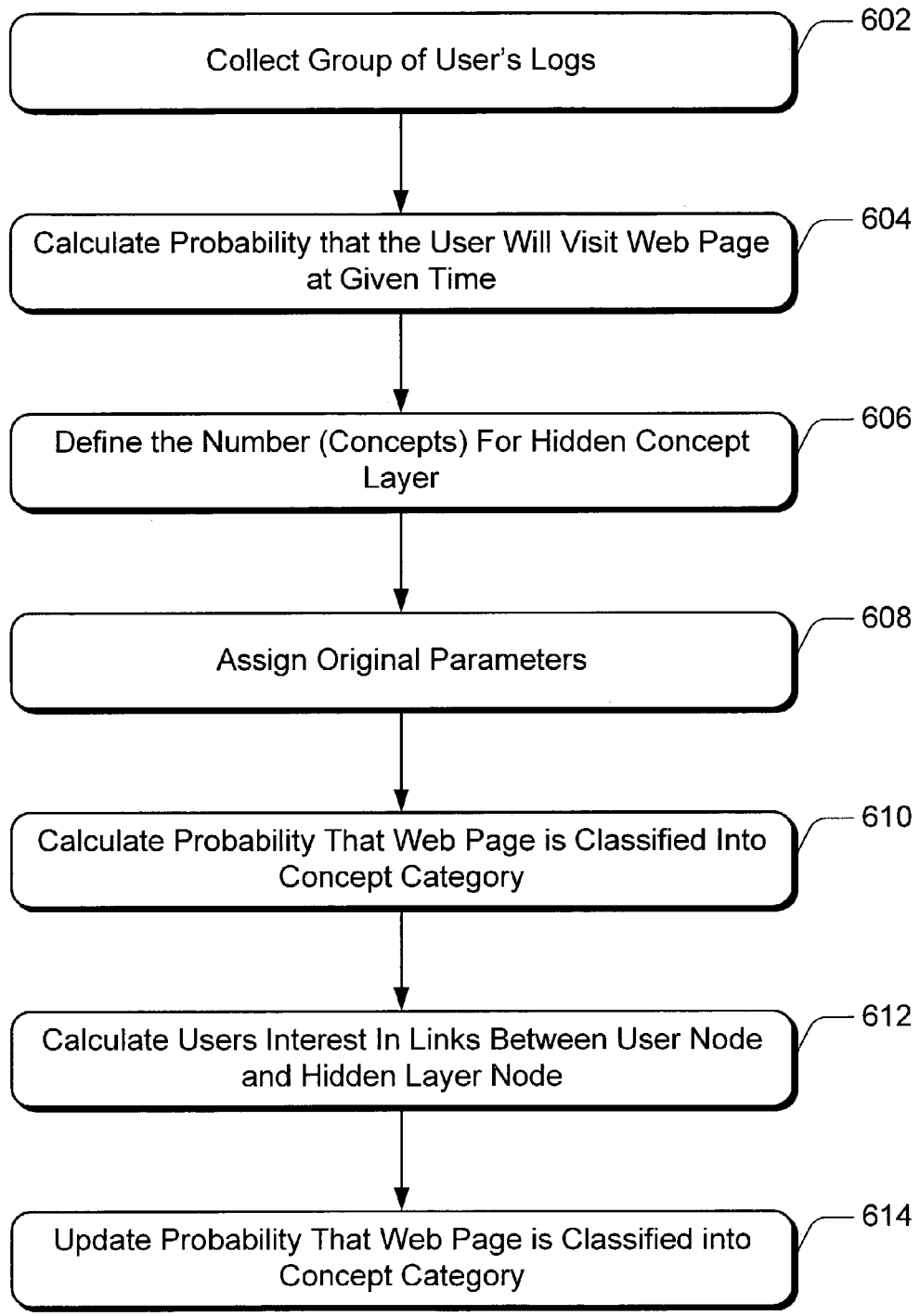
FIG. 7 is a flow chart of another embodiment of clustering algorithm.

One embodiment of the clustering algorithm in which Web page objects are clustered based on user objects can be outlined as follows as described relative to one embodiment of Web page clustering algorithm shown as 600 in FIG. 7:

1. Collect a group of users' logs as shown in 602.
2. Calculate the probability of the user $u_j$ will visit the Web page $p_i$ at a specific time $Pr(p_i \mid u_j)$ as set forth by (12), and 604 in FIG. 7.
3. Define the number |Concept| of nodes for the hidden concept layer (670 as shown in FIG. 6) in 606 of FIG. 7, and randomly assign the initial parameters for the vector for expectation $\vec{\mu}_k$ and the initial vector for covariance $\vec{\sigma}_k$ in 608 of FIG. 7.
4. Calculate a $Pr(p_i \mid c_k)$ value, which represents the probability that a Web page $p_i$ is classified into a concept category $c_k$, as set forth in (13) and 610 in FIG. 7.
5. Calculate $Pr(c_k \mid u_j)$, which represents the users interest in the links between a user node and a hidden layer node, which can be derived by (15) as shown in 612 in FIG. 7.
6. Update the $Pr(p_i \mid c_k)$ probability that a Web page is classified into a concept category as determined in the outline step 4 by solving (13) as shown in 614 of FIG. 7.
7. Re-estimate the parameters for each hidden concept node by using $Pr(p_i \mid c_k)$ as set forth in (13) as described relative to 616 in FIG. 7.
8. Go through (13) and (15) for several iterations to provide some basis for the values of the node sets (or at least until the model displays stable node set vector results).

Figure 8:
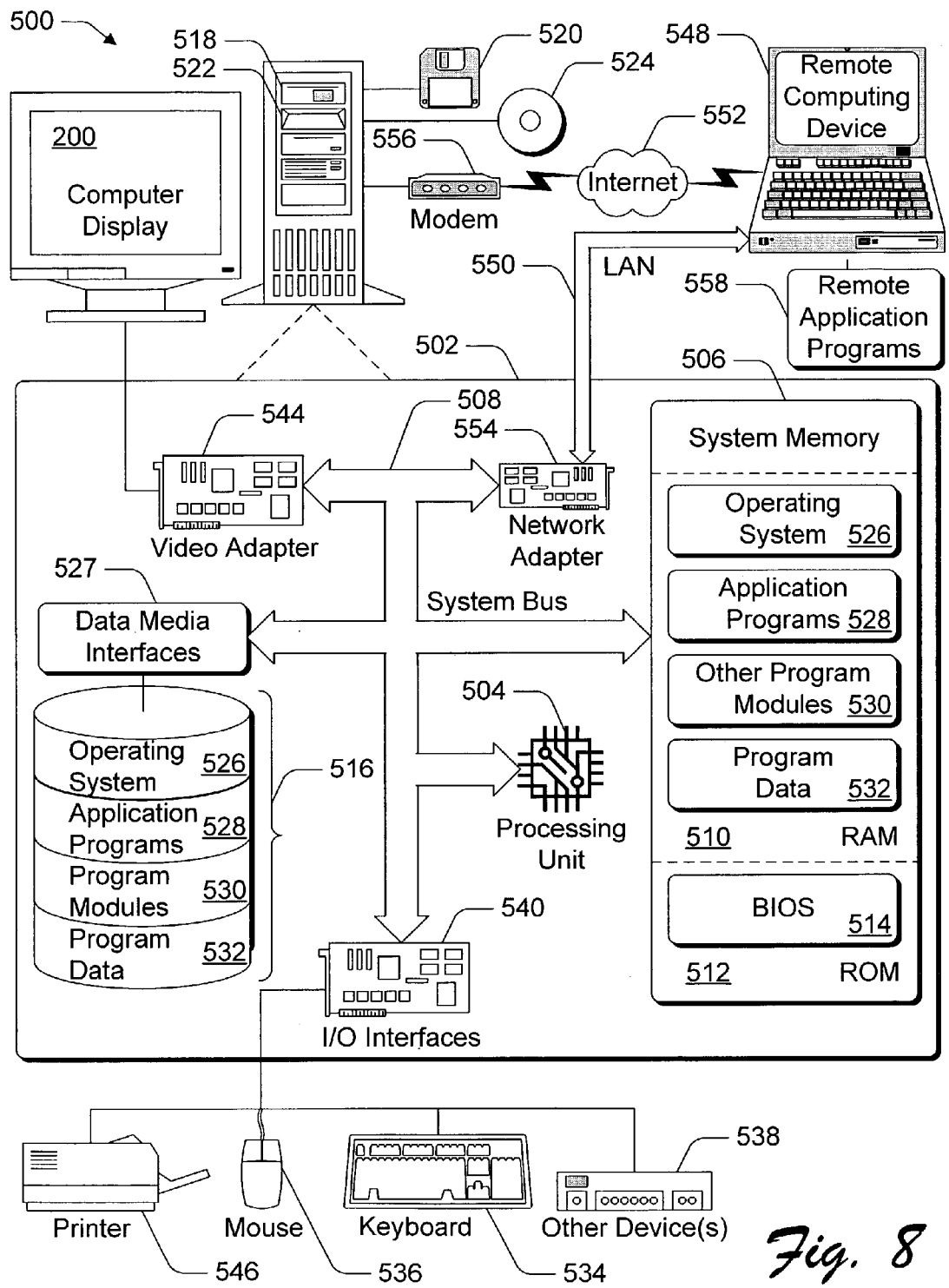
FIG. 8 illustrates a block diagram of one embodiment of a computer environment that can perform the clustering techniques as described in this disclosure.

FIG. 8 illustrates an example of a suitable computer environment or network 500 that includes a user interface which can provide a clustering algorithm and/or a framework graph. Similar resources may use the computer environment and the processes as described herein.

The computer environment 500 illustrated in FIG. 8 is a general computer environment, which can be used to implement the concept network techniques described herein. The computer environment can be considered as an embodiment of the embodiments of the computer embodiment 20 described above relative to FIGS. 1 and 4. The computer environment 500 is only one example of a computer environment and is not intended to suggest any limitation as to the scope of use or functionality of the computer and network architectures. Neither should the computer environment 500 be interpreted as having any dependency or requirement relating to any one or combination of components illustrated in the exemplary computer environment 500.

The computer environment 500 includes a general-purpose computing device in the form of a computer 502. The computer 502 can be, for example, one or more of a stand alone computer, a networked computer, a mainframe computer, a PDA, a telephone, a microcomputer or microprocessor, or any other computer device that uses a processor in combination with a memory. The components of the computer 502 can include, but are not limited to, one or more processors or processing units 504 (optionally including a cryptographic processor or co-processor), a system memory 506, and a system bus 508 that couples various system components including the processor 504 and the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

The computer 502 can include a variety of computer readable media. Such media can be any available media that is accessible by the computer 502 and includes both volatile and non-volatile media, and removable and non-removable media.

The system memory 506 includes the computer readable media in the form of non-volatile memory such as read only memory (ROM) 512, and/or volatile memory such as random access memory (RAM) 510. A basic input/output system (BIOS) 514, containing the basic routines that help to transfer information between elements within the computer 502, such as during start-up, is stored in the ROM 512. The RAM 510 can contain data and/or program modules that are immediately accessible to, and/or presently operated on, by the processing unit 504.

The computer 502 may also include other removable/non-removable, volatile/non-volatile computer storage media. By way of example, FIG. 8 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 515, magnetic disk drive 518, and optical disk drive 522 are each connected to the system bus 508 by one or more data media interfaces 540. Alternatively, the hard disk drive 516, magnetic disk drive 518, and optical disk drive 522 can be connected to the system bus 508 by one or more interfaces (not shown).

The disk drives and their associated computer-readable media provide non-volatile storage of computer readable instructions, control node data structures, program modules, and other data for the computer 502. Although the example illustrates a hard disk within the hard disk drive 516, a removable magnetic disk 520, and a non-volatile optical disk 524, it is to be appreciated that other types of the computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computer environment 500.

Any number of program modules can be stored on the hard disk contained in the hard disk drive 516, magnetic disk 520, non-volatile optical disk 524, ROM 512, and/or RAM 510, including by way of example, the OS 526, one or more application programs 528, other program modules 530, and program data 532. Each OS 526, one or more application programs 528, other program modules 530, and program data 532 (or some combination thereof) may implement all or part of the resident components that support the distributed file system.

A user can enter commands and information into the computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor, flat panel display, or other type of computer display 200 can also be connected to the system bus 508 via an interface, such as a video adapter 544. In addition to the computer display 200, other output peripheral devices can include components such as speakers (not shown) and a printer 546 which can be connected to the computer 502 via the input/output interfaces 540.

The computer 502 can operate in a networked environment using logical connections to one or more remote computers, such as a remote computer device 548. By way of example, the remote computer device 548 can be a personal computer, portable computer, a server, a router, a network computer, a peer device or other common network node, game console, and the like. The remote computer device 548 is illustrated as a portable computer that can include many or all of the elements and features described herein relative to the computer 502.

Logical connections between the computer 502 and the remote computer device 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 can includes a modem 556 or other means for establishing communications over the wide network 552. The modem 556, which can be internal or external to the computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with the computer environment 500, program modules depicted relative to the computer 502, or portions thereof, may be stored in a remote memory storage device. By way of example, remote application programs 558 reside on a memory device of the remote computer 548. For purposes of illustration, application programs and other executable program components such as the operating system are illustrated herein as discrete Web blocks, although it is recognized that such programs and components reside at various times in different storage components of the computer 502, and are executed by the data processor(s) of the computer 502. It will be appreciated that the network connections shown and described are exemplary and other means of establishing a communications link between the computers may be used.

Various modules and techniques may be described herein in the general context of the computer-executable instructions, such as program modules, executed by one or more computers or other devices. Generally, program modules include routines, programs, control objects, components, control node data structures, etc. that perform particular tasks or implement particular abstract data types. Often, the functionality of the program modules may be combined or distributed as desired in various embodiments.

An implementation of these modules and techniques may be stored on or transmitted across some form of the computer readable media. Computer readable media can be any available media that can be accessed by a computer. By way of example, and not limitation, computer readable media may comprise "computer storage media" and "communications media."

"Computer storage media" includes volatile and nonvolatile, removable and non-removable media implemented in any process or technology for storage of information such as computer readable instructions, control node data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The term "communication media" includes, but is not limited to, computer readable instructions, control node data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although systems, media, methods, approaches, processes, etc. have been described in language specific to structural and functional features and/or methods, it is to be understood that the invention defined in the appended claims is not necessarily limited to the specific features or methods described. Rather, the specific features and methods are disclosed as exemplary forms of implementing the claimed invention.

The invention claimed is:

1. A computer-implemented method for clustering data, comprising:
   selecting a first group of objects, wherein each selected object is associated with a webpage;
   calculating a hub weight vector h according to the first group of objects, such that $h=Aa+V^Tu$, wherein the hub weight vector assigns a weight to each object of the first group according to a number of links contained within the object to other objects among the first group of objects, and wherein a high value within the hub weight vector h indicates a hub website;
   calculating an authority weight vector a according to the first group of objects, such that $a=A^Th+V^Tu$, wherein the authority weight vector assigns a weight to each object of the first group according to a number of links from other objects within the first group to the object, and wherein a high value within the authority weight vector a indicates an authority website;
   selecting a second group of objects, wherein each selected object is associated with a user and includes at least one link to at least one of the first group of objects;
   calculating a user weight vector u representing relative importance of each user within the second group of objects, such that $u=V(a+h)$, wherein the user weight vector assigns a weight to each object of the second group according to:
      a frequency of visits by a user to authority and hub websites in the first group of objects; and
      a weight of the authority and hub web sites visited by the user;
   performing iterations, wherein each iteration re-calculates the vectors h, a and u, thereby converging the vectors to respective values,
   wherein the hub weight vector h and the authority weight vector a are based in part on the user weight vector u, such that elements of the h and a vectors are more highly weighted if they are associated with objects in the first group of objects visited by users associated with objects in the second group that are more highly weighted; and
   reporting webpages with a high hub weight and/or a high authority weight,
   wherein A is an adjacent matrix of a base set for all three vectors, h, a and u and V is a visit matrix of the users associated with the second group of objects to the webpages associated with the first group of objects.

2. The method of claim 1, wherein the vectors a, h and u are calculated according to:

$$\begin{cases} a(p) = \sum_{q \to p} h(q) + \sum_{r \to p} u(r) \\ h(p) = \sum_{p \to q} a(q) + \sum_{r \to p} u(r) \\ u(r) = \sum_{r \to p} a(p) + \sum_{r \to q} h(q) \end{cases}$$

wherein p and q stand for specific web pages and r stands for a specific user.

3. The method of claim 1, wherein re-calculating the vectors a, h and u in an iterative manner reflects changes in hyperlinks and browsing patterns.

4. The method of claim 1, wherein the reporting is performed upon convergence of the hub weight vector h and the authority weight vector a to their respective values.

5. The method of claim 1, wherein the first group of objects and the second group of objects are heterogeneous.

6. The method of claim 1, wherein the first group of objects is homogeneous.

7. The method of claim 1, wherein the second group of objects is homogeneous.

8. The method of claim 1, additionally comprising:
   clustering objects within the first and second groups by using iterative input from both web pages and users.

9. The method of claim 1, wherein performing iterations comprises:
   performing a k-means clustering algorithm.

10. The method of claim 1, wherein performing iterations comprises:
    initializing a, h and u as random values.

11. The method of claim 1, wherein performing iterations comprises:
    initializing a, h and u at a single uniform value.

12. The method of claim 1, wherein performing iterations comprises:
    updating values for vectors a, h and u based on Internet usage.

13. The method of claim 1, additionally comprising:
    configuring a framework graph to include a first layer corresponding to the first group of objects and a second layer corresponding to the second group of objects.

14. The method of claim 13, further comprising:
configuring the framework graph to include inter-layer links connecting objects of the first group of objects and objects of the second group of objects;
configuring the framework graph to include intra-layer links connecting objects of the first group of objects and other objects of the first group of objects; and
configuring the framework graph to include intra-layer links connecting objects of the second group of objects and other objects of the second group of objects.

15. The method of claim 14, additionally comprising:
clustering objects of the first group of objects based on weighted values of the inter-layer links.

16. The method of claim 14, additionally comprising:
weighting values associated with the intra-layer links within the first and second groups of objects.

17. The method of claim 14, additionally comprising:
weighting values of each inter-layer link based on that link's occurrence frequency.

18. The method of claim 14, additionally comprising:
configuring a hidden layer, wherein at least one of the inter-layer links comprises a first hidden inter-layer link that extends between the first group of objects and the hidden layer and a second hidden inter-layer link that extends between the second group of objects and the hidden layer.

19. The method of claim 14, wherein weights of the first hidden inter-layer link and the second hidden inter-layer link are modified during the iterations.

20. The method of claim 14, additionally comprising:
weighting links within the framework graph to reflect their relevance to an object to which the link is connected.

21. A computer-readable media, comprising computer-executable instructions for:
calculating a hub weight vector h, such that $h=Aa+V^Tu$, for elements in a web page set;
calculating an authority weight vector a, such that $a=A^Th+V^Tu$, for elements in the web page set;
calculating a user weight vector u, such that $h=V(a+h)$, representing relative importance of elements within a user set;
iteratively re-calculating the vectors a, h and u, wherein the re-calculating reflects changes in hyperlinks and browsing patterns expressed by A and V; and
reporting webpages with a high hub weight and/or a high authority weight; wherein A is a matrix indicating links between webpages and V is a matrix indicating visits of the user set to the webpage set.

22. The computer-readable media of claim 21, wherein calculating the hub weight vector assigns a weight to each element within the webpage set according to a number of links contained within the element to other elements among the webpage set, and wherein a high value within the hub weight vector h indicates a hub website.

23. The computer-readable media of claim 21, wherein the authority weight vector assigns a weight to each element of the webpage set according to a number of links to other elements within the webpage set, and wherein a high authority weight vector value indicates an authority website.

24. The computer-readable media of claim 21, wherein the user weight vector assigns a weight to each element in the user set according to:
a frequency of visits by a user to authority websites and hub websites; and
a weight of the authority web sites and the hub websites visited by the user.

25. The computer-readable media of claim 21, wherein the hub weight vector h and the authority weight vector a are based in part on the user weight vector u, such that elements of the h and a vectors are more highly weighted if they are associated with elements in the webpage set visited by users associated with elements in the user set that are more highly weighted.

26. A computer-readable media, comprising computer-executable instructions for:
calculating a hub weight vector h, such that $h=Aa+V^Tu$, and an authority weight vector a, such that $a=A^Th+V^Tu$, for elements in a webpage set;
calculating a user weight vector u, such that $u=V(a+h)$, representing relative importance of users;
maintaining adjacent matrix A indicating which webpages are linked and visit matrix V indicating webpages visited by users; and
iteratively recalculating vectors a, A and u to reflect changes to A and V; and
reporting webpages based on the recalculations.

27. The computer-readable media of claim 26, wherein calculating the hub weight vector assigns a weight to each element within the webpage set according to a number of links contained within the element to other elements among the webpage set, and wherein a high value within the hub weight vector h indicates a hub website.

28. The computer-readable media of claim 26, wherein the authority weight vector assigns a weight to each element of the webpage set according to a number of links to other elements within the webpage set, and wherein a high authority weight vector value indicates an authority website.

29. The computer-readable media of claim 26, wherein the user weight vector assigns a weight to each element in the user set according to:
a frequency of visits by a user to authority and hub websites in the first group of objects; and
a weight of the authority and hub web sites visited by the user.

30. The computer-readable media of claim 26, wherein the hub weight vector h and the authority weight vector a arc based in part on the user weight vector u, such that elements of the h and a vectors are more highly weighted if they are associated with elements in the webpage set visited by users associated with elements in the user set that are more highly weighted.

31. A computer-implemented method for clustering data, comprising:
selecting a webpage set comprising elements associated with webpages;
calculating a hub weight vector h for elements in the web page set, such that the hub weight is $h=Aa+V^Tu$;
calculating an authority weight vector a elements in the web page set, such that the authority weight is $a=A^Th+V^Tu$;
selecting a user set comprising elements associated with users and links between those elements and elements in the webpage set;
calculating a user weight vector u representing relative importance of elements within the user set, such that $u=V(a+h)$; and
reporting webpages with a high hub weight and/or a high authority weight;
wherein A is a matrix indicating links between webpages and V is a matrix indicating visits of the user set to the webpage set.

32. The method of claim 31, wherein the hub weight vector assigns a weight to each element within the webpage set according to a number of links contained within the element to other elements among the webpage set, and wherein a high value within the hub weight vector h indicates a hub website.

33. The method of claim 31, wherein the authority weight vector assigns a weight to each element of the webpage set according to a number of links to the weighted element from other elements within the webpage set, and wherein a high authority weight vector value indicates an authority website.

34. The method of claim 31, wherein the user weight vector assigns a weight to each element in the user set according to:
   a frequency of visits by a user to authority and hub websites in the first group of objects; and
   a weight of the authority and hub web sites visited by the user.

35. The method of claim 31, additionally comprising:
   performing iterations, wherein each iteration re-calculates the vectors h, a and u, thereby converging the vectors to respective values.

36. The method of claim 31, wherein the hub weight vector h and the authority weight vector a are based in part on the user weight vector u, such that elements of the h and a vectors are more highly weighted if they are associated with elements in the webpage set visited by users associated with elements in the user set that are more highly weighted.

37. The method of claim 31, wherein the vectors a, h and u are calculated according to:

$$\begin{cases} a(p) = \sum_{q \to p} h(q) + \sum_{r \to p} u(r) \\ h(p) = \sum_{p \to q} a(q) + \sum_{r \to p} u(r) \\ u(r) = \sum_{r \to p} a(p) + \sum_{r \to q} h(q) \end{cases}$$

wherein p and q stand for specific webpages and r stands for a specific user.

38. The method of claim 31, additionally comprising:
   iteratively re-calculating the vectors a, h and U; and
   converging the vectors to their respective values in the iterative calculations.

39. The method of claim 38, wherein iteratively re-calculating the vectors a, h and u reflects changes in hyperlinks and browsing patterns expressed by A and V.

40. The method of claim 31, additionally comprising:
   setting vectors a, h and u to initial values; and
   updating the vectors a, h and u in an iterative manner based on Internet usage.

* * * * *